Feb. 22, 1949.  D. A. GUERDAN ET AL  2,462,182
MOTOR HAVING COAXIAL COUNTER ROTATING SHAFTS
Filed Nov. 28, 1945  3 Sheets-Sheet 1

WITNESSES:
E. A. M?Closkey
E. F. Oberheim

INVENTORS
Dikran A. Guerdan
and John E. Bluman.
BY
Paul C. Friedemann
ATTORNEY

Feb. 22, 1949.   D. A. GUERDAN ET AL   2,462,182
MOTOR HAVING COAXIAL COUNTER ROTATING SHAFTS
Filed Nov. 28, 1945   3 Sheets-Sheet 2

WITNESSES:
E. A. McCloskey
E. L. Oberheim

INVENTORS
Dikran A. Guerdan
and John E. Bluman.
BY
Paul E. Friedemann
ATTORNEY

Feb. 22, 1949.　　　D. A. GUERDAN ET AL　　　2,462,182
MOTOR HAVING COAXIAL COUNTER ROTATING SHAFTS
Filed Nov. 28, 1945　　　　　　　　　　　　　3 Sheets-Sheet 3

WITNESSES:

INVENTORS
Dikran A. Guerdan
and John E. Bluman.
BY
Paul E. Friedemann
ATTORNEY

Patented Feb. 22, 1949

2,462,182

UNITED STATES PATENT OFFICE 2,462,182

MOTOR HAVING COAXIAL COUNTER-ROTATING SHAFTS

Dikran A. Guerdan, Wilkinsburg, and John E. Bluman, Sharon, Pa., assignors to Westinghouse Electric Corporation, East Pittsburgh, Pa., a corporation of Pennsylvania Application November 28, 1945, Serial No. 631,394

1 Claim. (Cl. 172—36)

This invention is generally related to rotating electrical machines and is particularly directed to an electrical motor in which the field and armature are counterrotatable.

The Government of the United States has been granted a certain royalty-free license for Government purposes with respect to the invention herein described.

The motor of this invention, for example, has utility in torpedo propulsion systems. Usually a torpedo is equipped with coaxially arranged propellers which are rotated in opposite directions. When a conventional motor is utilized to drive the two propellers a reversing gear type of drive is employed. With such a drive one propeller, usually the rear propeller, is driven by direct connection with the motor shaft. The reversing gear is also driven by the motor and its output is applied to the second propeller to cause opposite rotation thereof with respect to the first propeller. The motor of this invention is equipped with a pair of coaxial output shafts, one driven by the armature and the other driven by the field structure. These shafts are directly connected to the coaxial propeller assembly, eliminating the reversing gear, and effecting considerable savings in weight and equipment.

Generally, it is an object of this invention to provide an electric motor having a pair of coaxially arranged counterrotatable output shafts.

Specifically, it is an object of this invention to provide an electric motor which embodies a pair of coaxially arranged rotatable output shafts in which the motor field structure drives one shaft and the motor armature structure drives the other shaft.

The foregoing objects are merely illustrative of the various aims and objects of this invention. Other objects and advantages will become apparent upon a study of the following disclosure when considered in conjunction with the accompanying drawings, in which.

Figure 1:
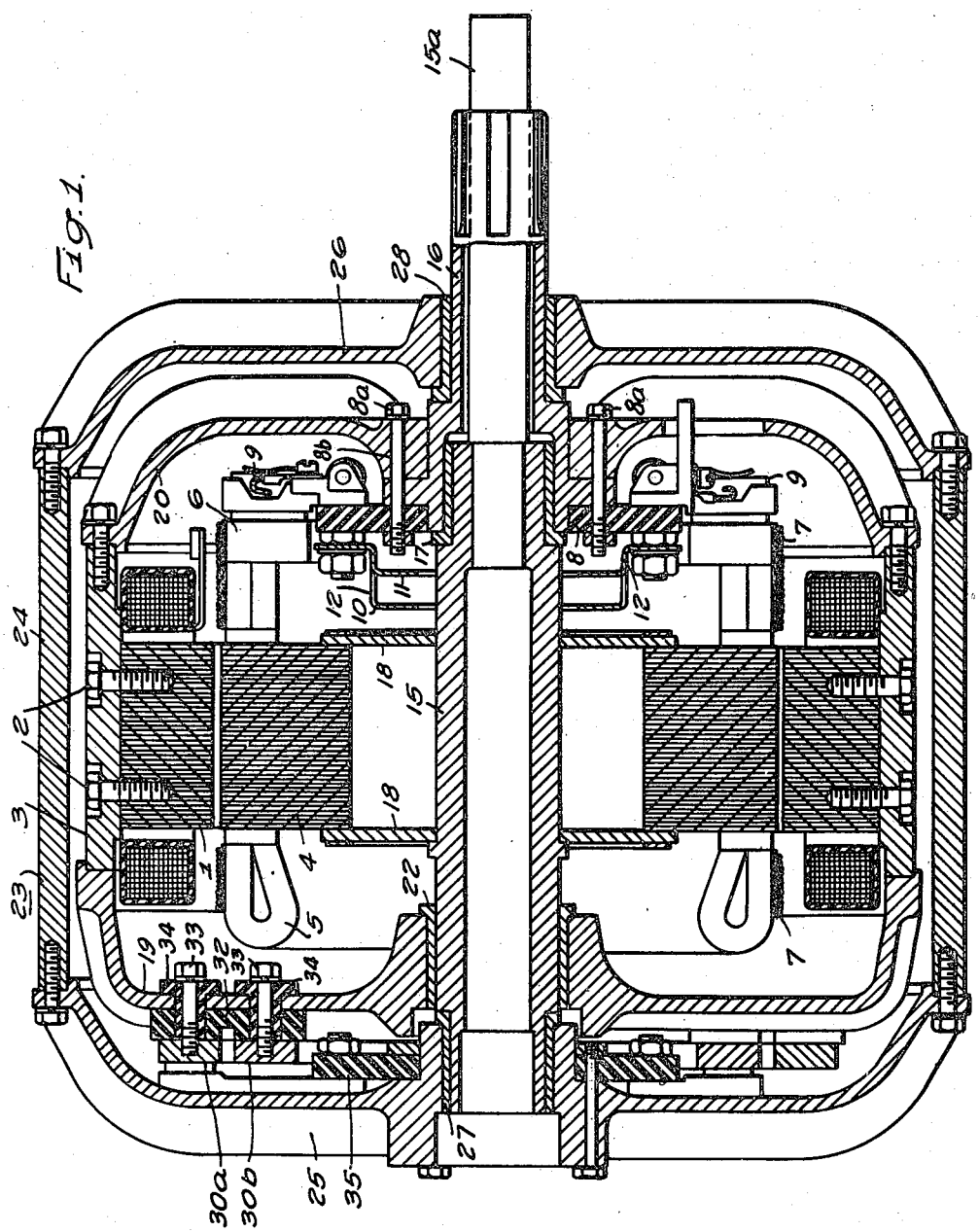
Fig. 1 is a longitudinal sectional view of an electric motor embodying the principles of this invention.

This invention as illustrated in the drawings and particularly in Fig. 1 in preferred form, is embodied in a direct current radial commutator type of motor. It will be apparent, however, to one skilled in the art that the structural features of this invention are not limited to any particular type of motor but may be applied with equal facility to substantially all types of motors.

The direct current motor is conventional insofar as its electrical and magnetic characteristics are concerned. However, in contradistinction to the conventional motor in which the field structure is usually mechanically stationary, the novel constructional features of this invention provide for free rotation of both the field and armature structures. A motor of the type herein disclosed, if employed to drive a pair of coaxially disposed propellers in opposite rotational directions is usually of twice the rating of the conventional motor but is much lighter in weight in proportion to power. That is, if the power needed to drive one propeller of a given torpedo at 1600 R. P. M. is 45 H. P., it would be necessary with a reversing gear type of drive for two propellers each capable of absorbing 45 H. P., to have a motor capable of developing 90 H. P. at 1600 R. P. M. Whereas with the counterrotating motor of this invention the motor rating would be 90 H. P. at 3200 R. P. M., which means a considerable saving in weight. Since the usual reversing gear in the conventional coaxial propeller drive is eliminated, a still further saving in weight is had as well as space and operating noise level of the torpedo drive.

The field structure of the motor conventionally includes six salient coil carrying poles 1 of laminated cross section which are assembled within the shell 3 of magnetic material and secured thereto by bolts 2. A drum wound armature 4 is concentrically disposed within the field pole circle and the conductor bars forming the armature winding 5 are brought out on the right hand side of the armature as viewed in Fig. 1 where they are connected to the conducting segments of the radial commutator 6. The commutator segments are supported entirely by the conductor bars to which the respective segments thereof are joined and the commutator assembly is banded, as are the coil turns projecting to the left of the armature structure, by means of the wire bands 7 which are insulated from the armature coil turns and the commutator segments. Further details of the radial commutator assembly may be had upon reference to the copending application of R. E. Rambo, et al., Serial No. 624,287, filed on October 24, 1945, now Patent 2,456,993, dated December 21, 1948, entitled Radial commutator and assigned to the same assignee as this invention. A commutator of the type described is advantageous in respect of design considerations in that a more compact design is achievable because of the central opening therein in which the brush holder ring 8 which supports the commutator brushes 9 may be disposed. Likewise, the short circuiting rings 10 and 11 each provided with fingers 12, the fingers 12 of the respective rings being connected to brushes of like polarity to provide electrical connection between the brushes, may also be disposed within the central commutator opening to thus take up space normally unused in electric motor design and thus further the end of compact design. Additional details on the subject of brush holder cross connections afforded by rings 10 and 11 may be had upon reference to the copending application of C. F. Jenkins, et al., Serial No. 624,286, filed on October 24, 1945, now Patent 2,431,255, issued November 18, 1947, entitled Motors and assigned to the same assignee as this invention.

The field and armature structures of this invention are assembled about a pair of coaxially disposed shafts 15 and 16, the shaft 16 being journaled over a portion of one extremity of the shaft 15 by means of the sleeve bearing 17, thus affording freedom for relative angular movement of the shafts. As illustrated, both of the shafts 15 and 16 are hollow and the shaft 15 terminates in the region of the bearing 17. A shaft extension 15a is pressed, splined or otherwise suitably secured, into the hollow extremity of the shaft 15 at the bearing 17 and extends through the hollow shaft 16. Thus a coaxial assembly of shafts is achieved, each shaft of which is adapted for connection, for example, to an assembly of coaxially disposed propellers.

Figure 3:
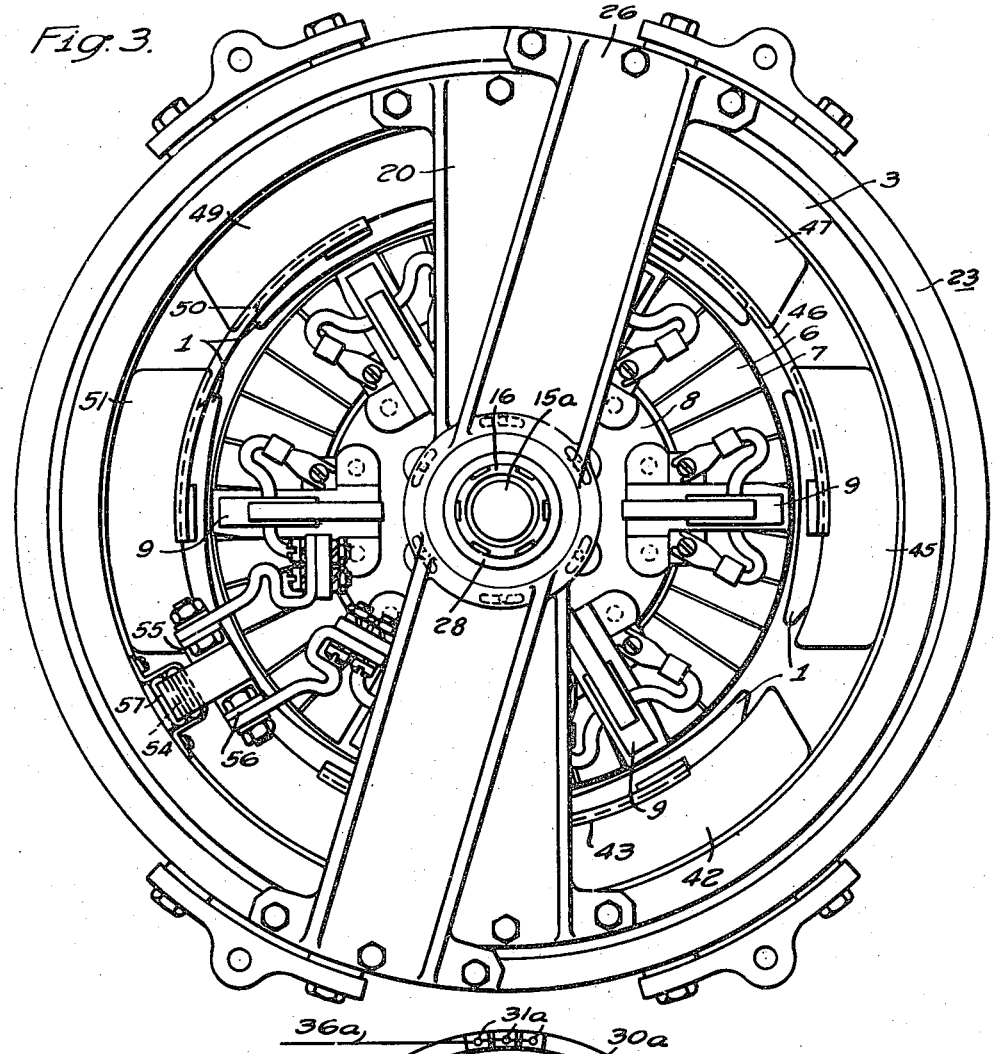
Fig. 3 is a view of the opposite end of the motor showing the commutator assembly.

Flanges 18, which fit over the shaft 15 and are secured thereto, support the armature structure 4 on the shaft 15. Spider 19 and bracket 20 preferably of some non-magnetic material, for example, aluminum, are joined at their outer extremities respectively to opposite sides of the shell 3 of magnetic material and provide a supporting structure for the field structure, which straddles the armature assembly on the shaft 15. Bracket 20 is tightly secured over a portion of the shaft 16 in the region of the bearing 17. Thus the motor air gap torque exerting a turning moment on the field structure is transmitted to the shaft 16. Spider 19 is journaled by means of a bearing 22 about the shaft 15. The brush holder ring 8 which carries the commutator brushes 9 is secured to the bracket 20 by means of the bolts 8a which extend through arcuate slots 8b in the hub portion of this spider. Slots 8b are provided so that the entire brush assembly may be rotated to effect brush shift for proper speed, horse power and commutation adjustments. This is accomplished by the simple expedient of loosening bolts 8a easily accessible from the end of the motor, as seen in Fig. 3.

A frame structure 23 consisting of the shell 24 and the brackets 25 and 26 straddles the motor field and armature assemblies. Motor shaft 15 is journaled in bearing 27 in bracket 25 while motor shaft 16 is journaled in the bearing 28 in bracket 26.

Electrical energy is supplied to the counter-rotating field and armature components of the motor through the medium of slip rings 30a and 30b and the slip ring brushes 31a and 31b. Slip rings 30a and 30b are each insulatedly secured to each of the six arms of spider 19 upon insulating segments 32 and, hence, rotate with the field structure. The assembly is secured by bolts 33 passing through tubular inserts 34 having a T-shaped cross-sectional configuration, and extending through the spider arms, the threaded extremities of the bolts threading into tapped holes in the slip rings. The six slip ring brushes arranged in two groups of three, designated 31a and 31b, are carried by a ring of insulating material 35 secured to the bracket 25 of stationary frame structure 23.

Figure 4:
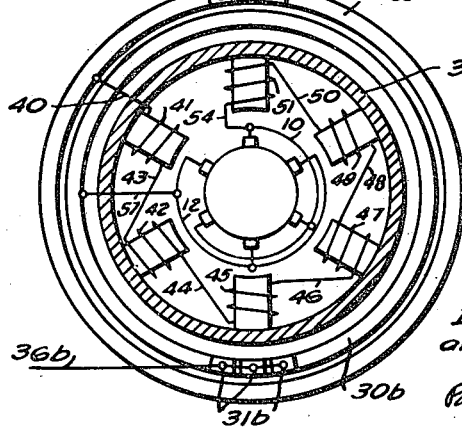
Fig. 4 is a diagrammatic showing of the electrical connections of the motor.

The electrical connections of the counter rotating field and armature components of the motor of this invention are diagrammatically illustrated in Fig. 4. Conductors 36a and 36b respectively connected to slip ring brush groups 31a and 31b are adapted for connection to a suitable source of unidirectional current (not shown). Slip ring 30a which rotates with the field structure is electrically connected to the field windings on the field poles 1. As illustrated, the connections form a series circuit. The end of the series field circuit opposite the slip ring 30a is connected, for example, to the positive group of the brushes 9, which brushes also rotate with the field structure, the positive brushes being connected together by, say, cross connection or short circuiting ring 10 here represented as a conductor. The negative group of the brushes 9 are tied together by the short circuiting ring 11 also, represented as a conductor in this figure, and thence electrically connected to slip ring 30b on the field structure.

Figure 2:
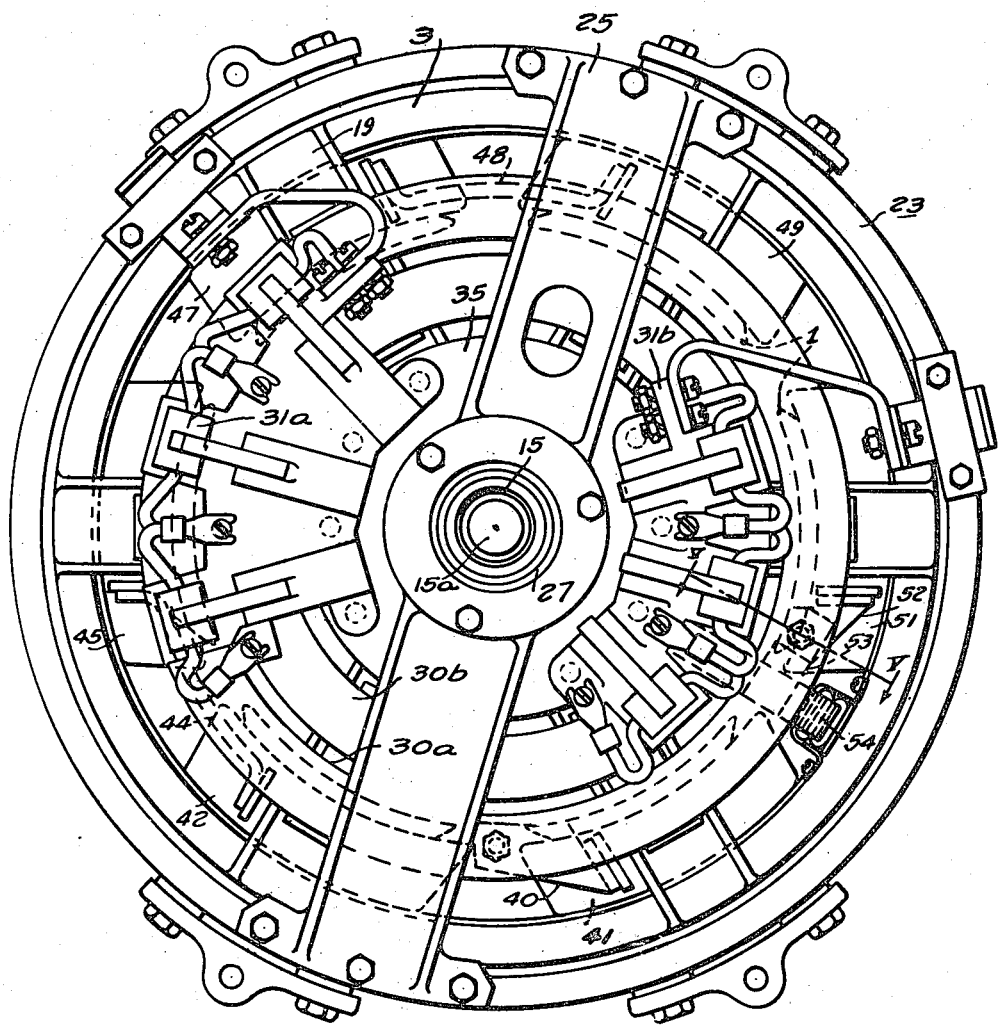
Fig. 2 is an end view of the motor showing the slip ring and brush assembly.
Figure 5:
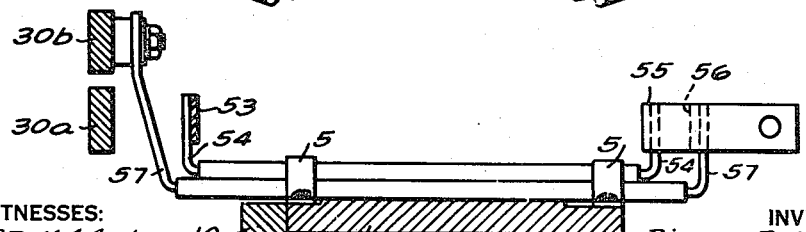
Fig. 5 is an enlarged view taken on the line V—V of Fig. 2.

The connections from slip ring 30a to the field and to the armature and, from the armature to the other slip or collector ring 30b, are illustrated in Figs. 2, 3 and 5, setting forth the mechanics of this invention. As seen in Fig. 2, slip ring 30a is connected to the field coil 41 by a lead 40 bolted at one extremity to the inside face of slip ring 30a and at its other extremity secured to the terminal of field coil 41. Field coil 41 at its other terminal (see Fig. 3) is connected to field coil 42 by the lead 43. Lead 44 (Fig. 2) connects coils 42 and 45. Lead 46 (Fig. 3) connects coils 45 and 47. Lead 48 (Fig. 2) connects coils 47 and 49. Lead 50 (Fig. 3) connects coils 49 and 51 and completes the series connections among the field coils. The remaining terminal of coil 51 (Fig. 3) is connected to a lead 52 in turn connected by a link 53 to a conductor 54 which passes longitudinally of the shell 3 (Fig. 5) and terminates at the other end of the motor in a terminal strip 55. As seen in Fig. 3, strip 55 is connected to one of the brushes 9 and the connection is completed through the remaining two brushes associated therewith, for example, by the short circuiting ring 10 in the manner previously described. The remaining group of three commutator brushes is connected to the terminal strip 56 attached to conductor 57 which extends longitudinally of the shell 3 and bolts to the inner face of slip ring 30b to complete the connection of the field windings, commutator and armature windings between the slip rings 30a and 30b.

The foregoing disclosure and the showings made in the drawings are merely illustrative of the principles of this invention and are not to be considered in a limiting sense, the only limitations are to be determined from the scope of the appended claim.

We claim as our invention:

An electric motor comprising, in combination, a field pole structure of magnetic material, an armature structure of magnetic material, windings on said armaure structure, windings on said field pole structure, a first shaft, means securing said amature structure to said first shaft substantially centrally thereof such that portions of said first shaft extend beyond the axial extremities of said armature structure, a second shaft of tubular configuration concentrically arranged about said first shaft on one side of said armature structure, bearing means joining said first and second shafts at a point adjacent said armature structure, supporting means secured to said field pole structure and straddling said armature structure, said supporting means being secured on one side thereof to said second shaft substantially in the plane of said bearing means, bearing means joining the opposite side of said supporting structure, which is on the opposite side of said armature structure from said first named bearing means, in bearing engagement with said first shaft to permit relative rotational movement, a frame structure straddling said supporting structure, bearing means joining one side of said frame structure to said second shaft and the other side of said frame structure to said first shaft, a commutator assembly supported adjacent said armature structure for rotation therewith and electrically connected to the windings on said armature structure, a plurality of commutator brushes comprising brush sets of opposite polarity, means securing said commutator brushes to said supporting structure with the commutator brushes in sliding engagement with said commutator, a pair of slip rings secured to said supporting structure between the supporting structure and frame structure, at least two slip ring brushes, one for each slip ring, means securing said slip ring brushes to said frame structure, each in sliding engagement with one of said slip rings, electrical conductor means connecting one of said slip rings to one side of the windings on the field pole structure, electrical conductor means connecting the other side of the windings on the field pole structure to a set of commutator brushes of one polarity, and electrical conductor means connecting the remaining set of commutator brushes of opposite polarity to the other side of said slip rings.

DIKRAN A. GUERDAN.
JOHN E. BLUMAN.

REFERENCES CITED

The following references are of record in the file of this patent:

UNITED STATES PATENTS

| Number | Name | Date |
|---|---|---|
| 1,212,476 | Goodridge | Jan. 16, 1917 |
| 1,351,999 | Heath | Sept. 7, 1920 |